United States Patent Office 2,873,551
Patented Feb. 17, 1959

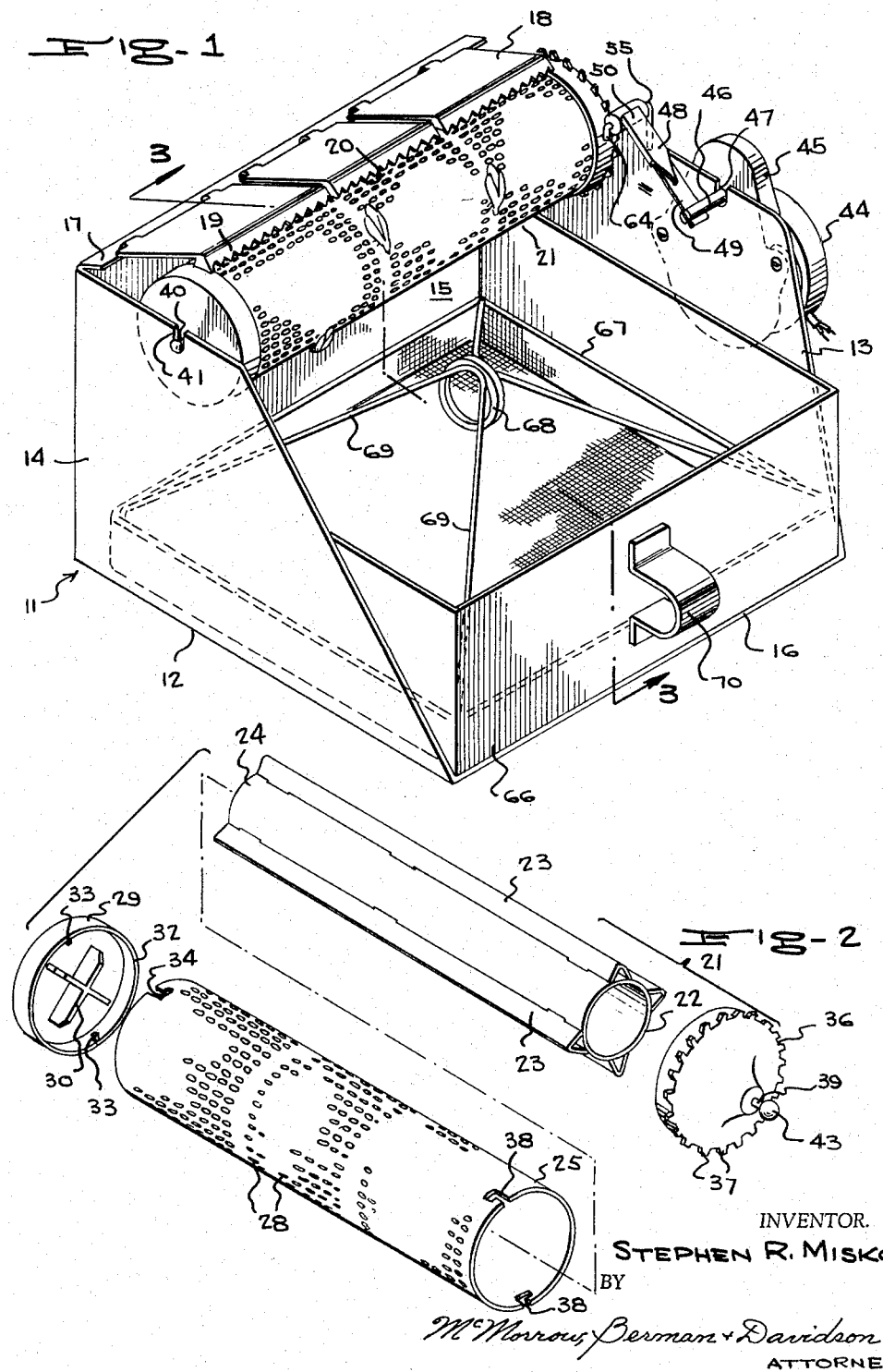

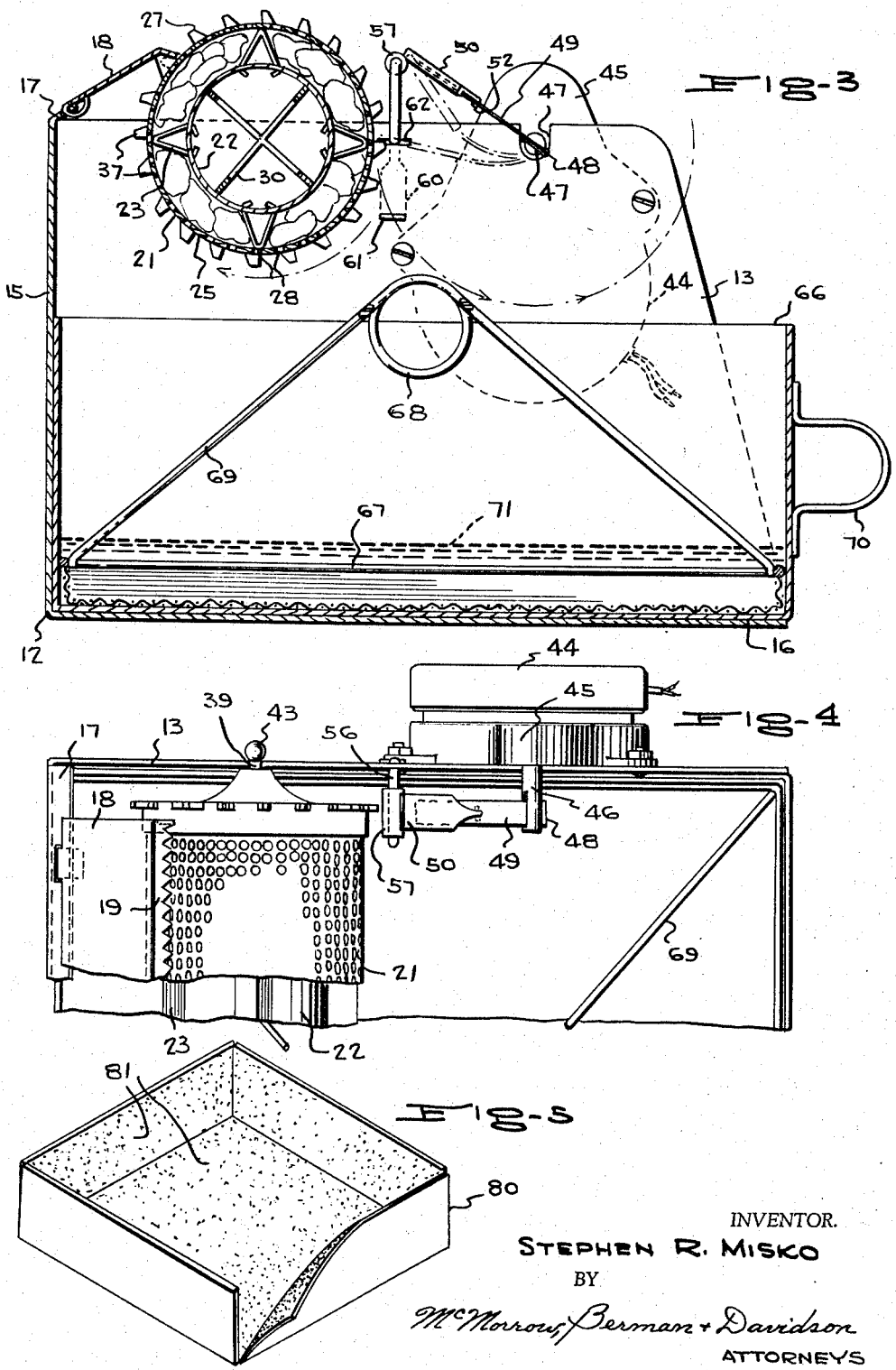

2,873,551

INSECT TRAP

Stephen R. Misko, New Orleans, La.

Application September 27, 1957, Serial No. 686,773

2 Claims. (Cl. 43—111)

This invention relates to insect extermination devices, and more particularly to an electrically operated roach trap.

A main object of the invention is to provide a novel and improved trap for catching roaches and similar insects, said trap being simple in construction, being automatic in operation, and providing a means for rapidly and effectively trapping and exterminating roaches and other crawling insects.

A further object of the invention is to provide an improved insect trap which is inexpensive to manufacture, which is durable in construction, which is sanitary, and which is easy to maintain in operating condition.

A still further object of the invention is to provide an insect trap which is usable to catch many different sizes of insects, which will operate over long periods of time without requiring attention, which does not require resetting and which will operate over a long period of time without rebaiting.

Further objects and advantages of the invention will become apparent from the following description and claims, and from the accompanying drawings, wherein:

Figure 1 is a perspective view of an improved insect trap constructed in accordance with the present invention.

Figure 2 is a perspective view of the bait cylinder employed in the trap of Figure 1, shown with the elements thereof in separated positions.

Figure 3 is a transverse vertical cross sectional view taken through the trap, said view being taken on the line 3—3 of Figure 1.

Figure 4 is a fragmentary top plan view of the trap showing the electric motor and the escapement means for intermittently rotating the perforated bait cylinder of the trap.

Figure 5 is a perspective view, to a reduced scale, showing an alternative insect-receiving receptacle which may be employed in the insect trap of the present invention in place of the liquid receptacle used in Figures 1 to 4.

Referring to the drawings, and more particularly to Figures 1 to 4, 11 generally designates an insect trap according to this invention, the trap comprising a supporting housing 12 having vertical side walls 13 and 14 and a vertical rear wall 15, the bottom edges of the walls 13, 14 and 15 being connected to a rectangular bottom wall 16, whereby to define the aforesaid housing. The rear wall is provided at its top edge with an inwardly and upwardly inclined flange 17 to which is hinged a scraping blade 18 formed at its free edge with a depending flange 19 having the serrated bottom edge 20 clearly illustrated in Figure 1.

Designated generally at 21 is a perforated cylinder adapted to contain bait material, said cylinder comprising a hollow inner cylindrical core 22 to which is secured a plurality of outwardly projecting hollow triangular ribs 23 spaced at equal angles around the axis of the cylinder 22 and defining channels 24 therebetween. The core comprising the cylindrical inner member 22 and the ribs 23 is slidably receivable in a perforated outer cylindrical shell 25, whereby the channels 24 define compartments adapted to receive bait material 27, as shown in Figure 3, the bait material being exposed through the apertures 28 in the outer cylinder 25.

Designated at 29 is an end cap engageable over one end of the outer cylinder, said end cap being formed with a cruciform, inwardly projecting central lug 30 adapted to be received inside one end of the inner cylinder element 22, whereby to serve as a centering means for said inner cylindrical element at one end of the bait cylinder, the cap member 29 being provided on its flange 32 with diametrically opposed inwardly projecting lugs 33, 33 lockingly engageable in bayonet slots 34 formed in the end portions of the perforated outer cylinder 25. Thus, the cap 29 is releasably secured to one end of the cylinder 25 by engaging the lugs 33 in the bayonet slots 34 and then rotating the cap slightly relative to the cylinder 25 in a direction to move the lugs 33 into the inner portions of the bayonet slots 34.

At the opposite end of the cylinder 25 another cap member 36 is provided, said cap member being similar in construction to the cap member 29 except that it is formed on its periphery with outwardly projecting escapement lugs 37 spaced evenly around the cap member. The cylinder 25 is formed with the diametrically opposed bayonet lugs 38, 38 which are lockingly engageable by inwardly projecting lugs provided on the cap member 36, similar to the lugs 33, 33 on the cap member 29.

The cap members 29 and 36 are provided with the outwardly projecting bearing shaft elements 39 and 40 which are engageable in vertical notches 41 formed in the top edges of the respective side walls 13 and 14 of the supporting housing 12.

The bearing shaft elements 39 and 40 are provided at their outer ends with the enlarged, generally spherical head portions 43 serving to aid in properly positioning the bearing shaft elements in the vertical notches 41 when the cylinder 21 is placed in the supporting housing 12, the head elements 43 serving to prevent endwise movement of the cylinder when mounted in the position thereof illustrated in Figure 1.

Designated at 44 is a conventional clock motor, or other synchronous motor, provided with suitable reduction gearing contained in a housing portion 45, said housing portion projecting from the main housing of the electric motor 44. The motor 44 is mounted on the side wall 13 of the supporting housing 12 with the housing portion 45 projecting upwardly, as shown in Figure 1. The output shaft of the electric motor 44 is designated at 46, said shaft being received in a vertical notch 47 formed in the top edge of the wall 13 of the supporting housing 12.

Designated at 48 is a resilient arm which is secured to the end portion of the output shaft 46, said resilient arm 48 extending perpendicular to the shaft 46 and parallel to the vertical side wall 13. The arm 48 comprises a flat main portion 49 of spring metal and a resilient outer portion 50, comprising a rubber sleeve-like member shaped to receive the outer end portion of the resilient main arm portion 49 and being suitably secured thereto, as by means of an inturned end lug 52 on the sleeve member 50 which is engaged through a locking aperture provided in the resilient main arm portion 49. The rubber sleeve 50 reduces noise and friction when the trap is operating.

Rigidly mounted on the side wall 13 between the electric motor 44 and the cap member 36 is an upstanding arm 55 formed at its top end with an inwardly projecting horizontal portion 56 on which is journaled a roller 57, the roller being located in the path of movement of the resilient arm 48 and being engageable by the outer end portion of the rubber sleeve element 50 when shaft 46 rotates. As shown in Figure 3, the path of movement of the end of the rubber sleeve element 50 is normally such as to include a lug element 37 on the escapement cap 36, but the roller 57 is located so that when the arm 48 rotates counterclockwise, as viewed in Figure 3, the sleeve element 50 will first engage the roller 57 and will be held thereby as shaft 46 continues to rotate, until finally the resilient portion 49 of arm 48 flexes sufficiently to allow the rubber sleeve member 50 to slip past the roller 57, the roller rotating to permit such slippage, whereby the arm 48 unflexes and sleeve element 50 strikes one of the lugs 37 with substantial impact, as illustrated in dotted view in Figure 3. The impact is sufficient to transmit a sudden torque to the cap 36 of sufficient magnitude to spin the perforated cylinder 21 through at least a full revolution.

The motor 44 operates at a speed such that arm 48 rotates relatively slowly, for example, rotates once in a period of several minutes, whereby the cylinder 21 is intermittently rotated at the same rate.

As shown, the arm 55 is provided with a flat offset lower portion 60 having the right angled bottom end portion 61 which is secured in a suitably shaped horizontal slot formed in the side wall 13. The inwardly offset upper portion of the arm 55 extends through a horizontal slot 62 formed in the upper portion of side wall 13 and is thus supported inwardly adjacent to the inside surface of side wall 13 in the upstanding position illustrated in Figures 1 and 3. The top portion 56 of the arm 55 is formed at its end with the downturned lug 64 which serves to prevent disengagement of roller 57 from the horizontal top arm portion 56.

Designated at 66 is a drawer or receptacle which is positioned in the lower portion of the supporting housing 12 and which contains a rectangular basket 67 formed of foraminous screen material, said basket being provided with the handle ring 68 which is connected to the corners of the basket 67 by wire arms 69, as is clearly shown in Figures 1 and 3. The drawer member 66 is provided on its front wall with a finger loop 70, whereby the drawer may be at times removed from the housing 12, for example, to empty the basket 67. In normal use, the drawer 66 contains insect-killing liquid or powder of sufficient amount to cover the basket 67, the liquid or powder being shown in dotted view at 71 in Figure 3.

As will be readily apparent, the bait material 27 in the perforated cylinder 21 attracts insects such as roaches or the like, which collect on the surface of the cylinder and which are intermittently scraped off by the action of the blade 18 each time that the cylinder is rotated by the escapement mechanism driven by electric motor 44, comprising the resilient arm 48 and the escapement cap 36 whose lugs 37 are intermittently engaged by the arm as it slips past the roller 57. The insects drop into the insect-killing material 71 in the drawer 66 and collect in the basket 67. After a substantial quantity of insects have collected in the basket, the drawer 70 may be removed from the housing 12 by sliding the drawer outwardly, allowing the basket 67 to be lifted out of the drawer and to be emptied. The basket may then be replaced and the drawer may be reinserted in the housing 12 for further use.

Instead of employing the insect-killing material 71 and the basket 67, a generally rectangular container 80 may be employed in the drawer 66, the container 80 being shown in Figure 5, and comprising wall surfaces coated with adhesive material 81. As will be readily understood, when the insects are scraped from the cylinder 21 by the action of the escapement mechanism driven by electric motor 44, the insects come into contact with the adhesive surfaces in the container 80 and are caught thereby. After a sufficient quantity of insects have been collected in the container 80, the drawer 66 may be removed from the housing 12 and the container 80 may be disposed of, being replaced by a new container.

As will be readily apparent from the above description, the trap has no trigger and therefore requires no setting or oiling. The trap will operate as long as it is connected to a power receptacle and will therefore remain in operation over long periods of time without requiring rebaiting or other attention. The use of the trap of the present invention eliminates the need for using roach tablets, poison sprays or fumigation in the location in which the trap is employed.

As will be further apparent, the trap of the present invention is usable to catch crawling insects of various different sizes and may be left in operation and unattended for several days at a time.

While certain specific embodiments of an improved insect trap have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an insect trap, a support, a perforated cylinder adapted to contain bait material journaled on said support, a trap receptacle beneath said cylinder, a scraping blade mounted on said support and engaging the surface of said cylinder substantially along its entire length, an electric motor mounted on said support, outwardly projecting escapement lugs mounted on and spaced evenly around said cylinder, a stop member mounted on said support transverse to the plane of said lugs and outwardly adjacent said escapement lugs, and a resilient escapement arm drivingly connected to said motor and being engageable with said stop member, said arm being formed and arranged to intermittently disengage from said stop member and strike one of said lugs, whereby to intermittently rotate said cylinder.

2. In an insect trap, a support, a perforated cylinder adapted to contain bait material journaled on said support, a trap receptacle beneath said cylinder, a scraping blade hinged to said support on an axis parallel to that of the cylinder and engaging the top surface of said cylinder substantially along its entire length, an electric motor mounted on said support, outwardly projecting escapement lugs mounted on one end portion of said cylinder and spaced evenly around said cylinder, said motor being located adjacent said one end portion, a stop member mounted on said support transverse to the plane of said lugs and outwardly adjacent said escapement lugs, a roller journaled on said stop member, and a resilient escapement arm drivingly connected to said motor and being engageable with said roller, said arm being formed and arranged to intermittently disengage from said roller and strike one of said lugs, whereby to intermittently rotate said cylinder.

References Cited in the file of this patent
UNITED STATES PATENTS

| | | |
|---|---|---|
| 1,035,845 | Barr | Aug. 20, 1912 |
| 1,277,298 | Dreilick | Aug. 27, 1918 |
| 1,961,303 | Reynolds | June 5, 1934 |